United States Patent
Frenkler

(10) Patent No.: US 6,521,066 B1
(45) Date of Patent: Feb. 18, 2003

(54) PROCESS AND APPARATUS FOR PRODUCING A FILM SHEET

(75) Inventor: Dieter Frenkler, Schwelm (DE)

(73) Assignee: Jackstadt GmbH, Wuppertal (DE)

( * ) Notice: Subject to any disclaimer, the term of this patent is extended or adjusted under 35 U.S.C. 154(b) by 0 days.

(21) Appl. No.: 09/520,956

(22) Filed: Mar. 8, 2000

(30) Foreign Application Priority Data

Mar. 8, 1999 (DE) .......................................... 199 09 864

(51) Int. Cl.[7] .......................... B32B 31/00; B32B 31/10; B32B 27/32
(52) U.S. Cl. ...................... 156/64; 156/229; 156/306.3; 156/310; 427/8; 427/146
(58) Field of Search .......................... 156/64, 229, 241, 156/247, 277, 230, 237, 238, 306.3, 310; 427/146, 147, 148, 149, 8; 428/40.1, 41.7, 41.8, 42.2

(56) References Cited

U.S. PATENT DOCUMENTS

| | | | |
|---|---|---|---|
| 4,035,218 A | * | 7/1977 | Yount .......................... 156/289 |
| 4,738,891 A | * | 4/1988 | Vighi .......................... 428/201 |
| 5,034,269 A | | 7/1991 | Wheeler |
| 5,397,634 A | * | 3/1995 | Cahill et al. .............. 428/304.4 |
| 5,681,660 A | * | 10/1997 | Bull et al. ................... 428/500 |
| 5,871,837 A | * | 2/1999 | Adair .......................... 428/206 |
| 5,965,226 A | * | 10/1999 | Muschelewicz et al. ... 428/42.3 |

FOREIGN PATENT DOCUMENTS

| | | | |
|---|---|---|---|
| EP | 0 213 737 B1 | 3/1987 | |
| GB | 2135934 A | * 9/1984 | ........... B32B/31/10 |
| JP | 04164988 A | * 6/1992 | ........... C09J/201/00 |

OTHER PUBLICATIONS

Josef Hansmann, "Corona–Oberflächenbehandlung," Adhäsion, 1979, Heft 5.

\* cited by examiner

Primary Examiner—Richard Crispino
Assistant Examiner—Sue A. Purvis
(74) Attorney, Agent, or Firm—Nixon Peabody LLP; David S. Safran

(57) ABSTRACT

A process for producing a film sheet (1), having at least one print carrier layer (2) of plastic, an adhesive layer (6) and a cover layer (8), in which the adhesive layer (6) is applied to the print carrier layer (2), the print carrier layer (2) which is provided with the adhesive layer (6) is sent for drying and the print carrier layer (2) which is provided with the adhesive layer (6) after drying is combined with the cover layer (8) to produce the film sheet (1) made easier and more economical, while preventing damage to the print carrier layer during drying, by the fact that the temperature of the print carrier layer (2) provided with the adhesive layer (6) is automatically controlled. An apparatus (10) for performing this process is also provided.

15 Claims, 3 Drawing Sheets

PROCESS AND APPARATUS FOR PRODUCING A FILM SHEET

BACKGROUND OF THE INVENTION

1. Field of the Invention

The invention relates to a process for producing a film sheet having at least one print carrier layer of plastic, an adhesive layer and a cover layer, the adhesive layer being applied to the print carrier layer, the print carrier layer provided with the adhesive layer being sent for drying and the print carrier layer provided with the adhesive layer after drying being combined with the cover layer to produce the film sheet. Furthermore the invention relates to an apparatus for performing the process.

2. Description of Related Art

In a known process for producing a film sheet, which is conventionally called a transfer process, the adhesive is applied to the cover layer which is coated with an adhesive-repellant silicone layer. Then, the silicone-treated cover layer with the applied adhesive is sent to a drying station so that the adhesive on the cover layer dries. Parallel thereto and subsequently, a so-called primer is applied to the plastic print carrier layer, and then, the print carrier layer provided with the primer and the cover layer with the applied adhesive are combined into the film sheet.

However, the above described transfer process has various disadvantages. With respect to the surface tension of the adhesive, wetting faults can occur upon application to the adhesive-repellant silicone layer. To preclude these wetting faults in the application of the adhesive, appropriate additives must be mixed into the adhesive. Thus, a corresponding mixing system is necessary. Furthermore the silicone-treated cover layer, upon application of the adhesive and during subsequent drying, is relatively strongly stressed. This stress is disadvantageous since the silicone layer which has been applied to the cover layer is generally very thin (up to roughly 1 micron) and damage to the silicone layer can easily occur even under low stresses. In this way, major problems can arise in a later detachment of the print carrier layer from the silicone-treated cover layer.

Furthermore, a process of the initially described type is known from practice; it is usually called the direct process. The direct process has been applied to date in print carrier layers made of PVC, the adhesive being applied to the PVC print carrier layer. After applying the adhesive, the layer material is sent to a drying station. When the adhesive on the PVC print carrier layer is dried, the temperature of the print carrier layer is only controlled by means of air temperature. The problem is that, in the direct process, plastic deformation and damage to the print carrier layer can occur when the allowable temperatures of the print carrier layer are not maintained.

The difference between the transfer process and the direct process is therefore that the adhesive in the transfer process is applied to the cover layer, while in the direct process the adhesive is applied to the print carrier layer. One advantage of the direct process is that the cover layer, and the silicone layer which is generally provided on the cover layer, are not unnecessarily stressed, as is the case in the transfer process. Therefore, damage to the silicone layer cannot occur. Another advantage of the direct process arises by the adhesive no longer being applied to an adhesive-repellant layer, but to the print carrier layer, and as a result, basically no additives need be added to the adhesive to preclude wetting faults. However, in the direct process, there is the danger of damage to the print carrier layer during heat treatment in the course of drying.

SUMMARY OF THE INVENTION

The primary object of this invention is to provide a process for producing a film sheet which can be carried out easily and economically, and with which damage to the print carrier layer is prevented during drying.

A second object of the invention is also to provide an apparatus for carrying out the aforementioned process.

The process in accordance with the invention, in which the aforementioned object is achieved, is characterized essentially in that the temperature of the print carrier layer provided with the adhesive layer is controlled. In the invention, the adhesive layer is applied to the print carrier layer and the print carrier layer provided with the adhesive layer is sent for drying. Here, the actual temperature of the print carrier layer provided with the adhesive layer is measured during drying. Depending on the measured current temperature of the print carrier layer provided with the adhesive layer, the drying temperature is adjusted to achieve a stipulated theoretical temperature of the print carrier layer. It should be pointed out in this connection that the adhesive layer need not be applied directly to the print carrier layer. The interposition of at least one other layer is easily possible, as is explained below.

In the implementation of the invention, it has been recognized that the print carrier layer which is provided with the adhesive layer can be damaged when the layer material assumes an overly high temperature during the drying process. For a faultless print carrier layer, drying in an exactly defined temperature range or at an exactly stipulated temperature is necessary. This drying which leads to neither plastic deformation nor other damage to the print carrier layer which is provided with the adhesive layer is accomplished in the invention by the fact that, in contrast to the known direct process, the temperature of the layer material comprising the adhesive layer and the print carrier layer is no longer controlled, but adjusted. Therefore, measurement of the current temperature of the print carrier layer which is provided with the adhesive layer and subsequent adjustments are done to achieve a certain set temperature of this layer material. In the invention, the temperature of the print carrier layer provided with the adhesive layer represents the controlled variable.

The process in accordance with the invention is especially suited for use with a material of the print carrier layer which is especially temperature sensitive. In this connection, especially polyolefins such as polypropylene, polybutene or polyethylene should be mentioned. These plastics are extremely sensitive to temperature and have a nonlinear temperature behavior. As soon as a certain critical temperature is reached or exceeded, a print carrier layer composed of this material is damaged. However, a print carrier layer of this plastic has good printability and durability. With the process according to the invention, for the first time, it is now possible to be able to use print carrier layers of polyolefins within the framework of the direct process without the danger of damage to this material during drying. In particular, when a plastic of this type is used as the material of the print carrier layer, the desired temperature is between 50° C and 70° C., and especially about 60° C. At this temperature, it is ensured that, on the one hand, prompt and good drying of the adhesive occurs, and on the other hand, that damage by plastic deformation of the print carrier layer is reliably prevented.

Although it would be fundamentally possible to measure the current temperature of the print carrier layer provided with the adhesive on the adhesive-free side via a sensor which has contact with this side, noncontact measurement of the temperature of the print carrier layer provided with adhesive is recommended. This precludes any loading by and onto the temperature sensors.

Otherwise, in addition to measuring the temperature of the print carrier layer provided with the adhesive, it is a good idea to provide another "regulator" to achieve a faultless film sheet. To do this, it is provided that, during drying, the tensile stress in the lengthwise direction of the print carrier layer provided with adhesive is measured and adjusted to a stipulated value. The tensile stress can be measured, fundamentally, even independently of the temperature control of the film sheet, i.e., even without temperature control of the film sheet. The tensile stress of the print carrier layer provided with adhesive is dependent among others on the material and the thickness of this layer. Generally, the tensile stress is controlled such that tensile stress in the film sheet is between 20 and 100 N/m. In particular, in conjunction with a print carrier layer made of polyolefin, the theoretical tensile stress is roughly 40 N/m.

To preclude any wetting faults in the application of the adhesive to the print carrier layer in any case, in one preferred embodiment of the invention, it is provided that the interfacial energy of the print carrier layer before applying the adhesive layer is changed depending on the surface tension of the adhesive, such that essentially complete wetting of the side of the print carrier layer with the adhesive, i.e., the side facing the adhesive layer, occurs and/or that a good connection of this side to the adhesive occurs. Preferably, to change the interfacial surface energy in the aforementioned way, the side of the print carrier layer facing the adhesive layer is subjected to corona treatment. Corona treatment is an especially good idea when a material is used for the adhesive layer in which the danger of migration of the molecules of adhesive into the print carrier layer is very low, so that a protective or primer layer is not necessary.

In order to preclude the danger of migration of the molecules of the adhesive into the material of the print carrier layer in any case, in another embodiment of the invention, it is provided that a primer layer which has been known for years is applied to the side of the print carrier layer facing the adhesive layer before applying the adhesive layer.

After applying the primer layer to the print carrier layer, it is likewise necessary to carry out the drying stage. To prevent plastic deformation or damage of the print carrier layer provided with the primer layer in this connection, it is provided that the temperature of the print carrier layer provided with the primer layer is adjusted during drying. It is therefore also provided in this connection that the temperature of the print carrier layer provided with the primer layer is measured during drying, and depending on the measured temperature of the print carrier layer provided with the primer layer, the drying temperature during drying is influenced to achieve a stipulated desired temperature of the print carrier layer provided with the primary layer. Otherwise, it is of course also a good idea in this connection for the tensile stress of the print carrier layer provided with the primer layer to be measured during drying and adjusted to a stipulated theoretical tensile stress. In doing so, the temperature, on the one hand, and the tensile stress, on the other hand, can be kept within the aforementioned limits. It goes without saying that the temperature of the print carrier layer provided with the primer layer is measured without contact in this case as well.

In conjunction with the film sheet of the invention, a paper layer or even a plastic layer which is provided with an adhesive-repellant layer, especially a silicone layer, can be easily used as the cover layer in the conventional manner.

In addition, the invention, as initially mentioned, also relates to an apparatus for performing the aforementioned process. The apparatus in accordance with the invention has at least one drying station with a heat generating means, a measurement means in the area of the drying station for, especially, noncontact measurement of the temperature of the print carrier layer provided with the adhesive layer and/or the print carrier layer provided with the primer layer and a control means in the drying station which is coupled to the heat generating means. The heat generating means coupled to the control means therefore changes the drying temperature in the drying station depending on the current temperature of the layer material.

In one preferred embodiment of the apparatus according to the invention, there is a measurement means for measuring the tensile stress in the longitudinal direction of the print carrier layer provided with the adhesive layer and/or the print carrier layer provided with the primer layer. Furthermore, there is a control means for the tensile stress which is coupled to the tensile stress adjustment means. Depending on the determined tensile stress, the tensile stress is adjusted to the desired theoretical tensile stress by the tensile stress adjustment means which is coupled to the control means.

These and further objects, features and advantages of the present invention will become apparent from the following description when taken in connection with the accompanying drawings which, for purposes of illustration only, show a single embodiment of a film produced in accordance with the process and apparatus of the invention.

DETAILED DESCRIPTION OF THE INVENTION

Figure 4:
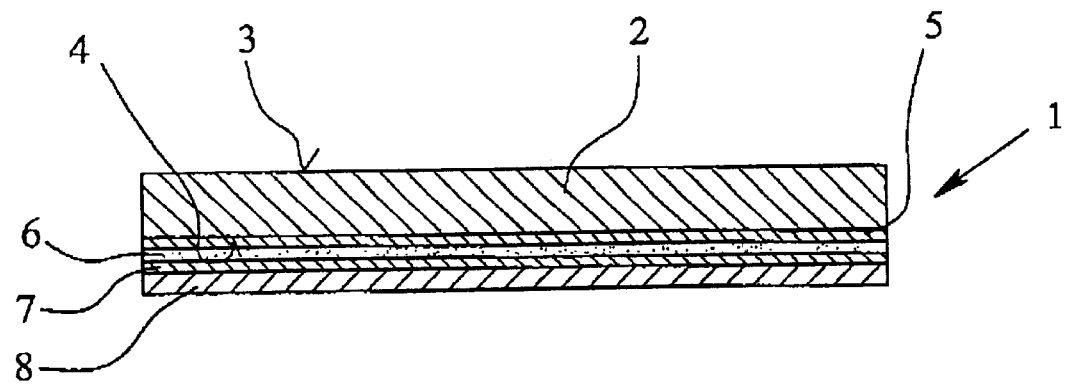
FIG. 4 shows a cross-sectional view of the film sheet in accordance with the invention after the last process step of production.

FIG. 4 shows a film sheet 1 which has been produced using the process in accordance with the invention in which a print carrier layer 2 has been provided with a top layer 3 which is intended for later printing. The print carrier layer 2 is made of a polyolefin. In this embodiment, a primer layer 5 has been applied to the bottom 4 of the print carrier layer 2. The primer here is free of solvents. In turn, an adhesive layer 6 with a removable adhesive has been applied to the primer layer 5. The adhesive can be any adhesive known from practice. All commercial primers which can be used in conjunction with plastic print carrier layers can be used as the primer. The adhesive layer 6, in turn, lies on a silicone layer 7 of a cover layer 8. The cover layer 8 is a paper layer.

In the following, the process steps in accordance with the invention are briefly explained using the individual figures.

Figure 1:
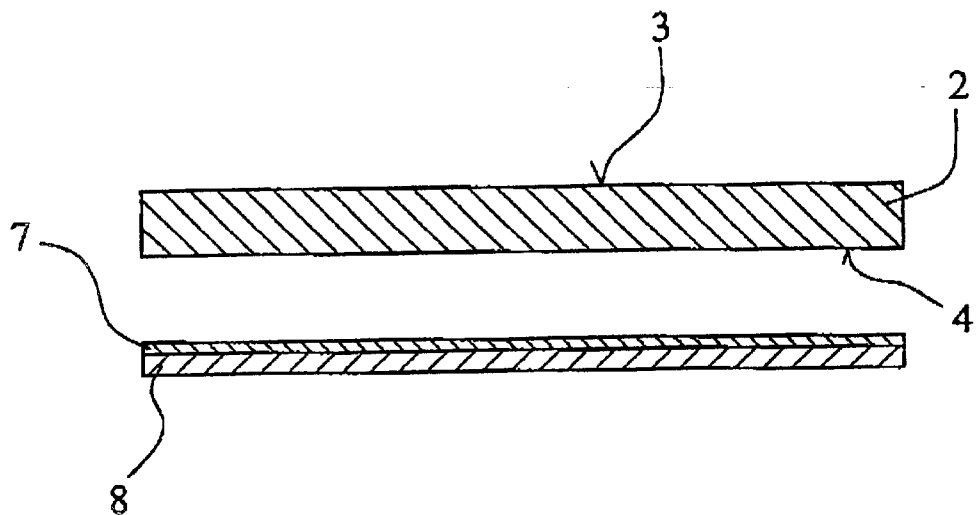
FIG. 1 shows a cross-sectional view of layer materials of a film sheet in accordance with the invention at the start of production.

First of all, as shown in FIG. 1, the print carrier layer 2, on the one hand, and the cover layer 8 provided with the silicone layer 7, on the other hand, are the initial layer materials.

Figure 2:
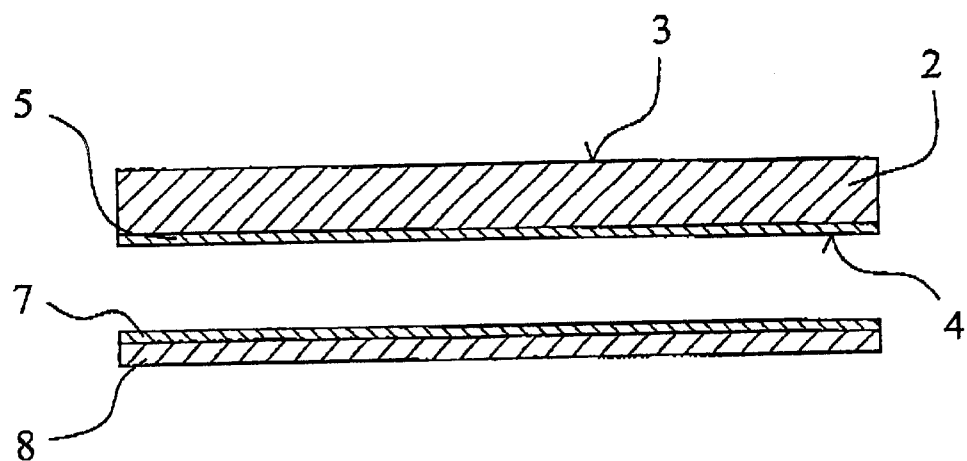
FIG. 2 shows a cross-sectional view of layer materials of a film sheet in accordance with the invention after the first process step.

As shown in FIG. 2, the primer layer 5 has been applied to the bottom 4 of the print carrier layer 2. After applying the primer layer 5, it is dried onto the print carrier layer 2 at a predetermined temperature, the temperature of the print carrier layer 2 provided with the primer layer 5 being measured and adjusted during drying. In addition, during drying, the tensile stress in the longitudinal direction of the print carrier layer 2 provided with the primer layer 5 is measured and adjusted to a predetermined theoretical tensile stress.

It is noted that the primer layer 5 can also be omitted. In such a case, the bottom 4 of the print carrier layer 2 can be subjected to corona treatment in order to change the surface energy of the bottom 4 to match the bottom 4 to the surface tension of the adhesive of the adhesive layer 6 to be subsequently applied, so that no wetting problems arise.

Figure 3:
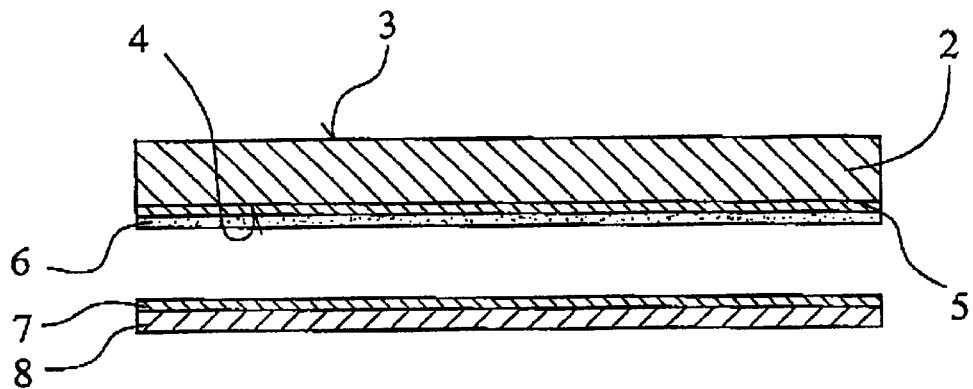
FIG. 3 shows a cross-sectional view of layer materials of a film sheet in accordance with the invention after another process step.

After applying the primer layer 5, the adhesive layer 6 is applied to it, as is shown in FIG. 3, and then this layer material is sent for drying. In doing so, the temperature of the layer material comprising the print carrier layer 2, the primer layer 5 and the adhesive layer 6 is measured and adjusted to a desired temperature of roughly 60° C., the temperature of the layer material being measured without contact. Otherwise, during drying of the layer material, the tensile stress is measured and adjusted to a desired tensile stress of roughly 40 N/m.

FIG. 4 shows the film sheet 1 after the layer material has been assembled or laminated after drying with the cover layer 8 which has the silicone layer 7.

Figure 5:
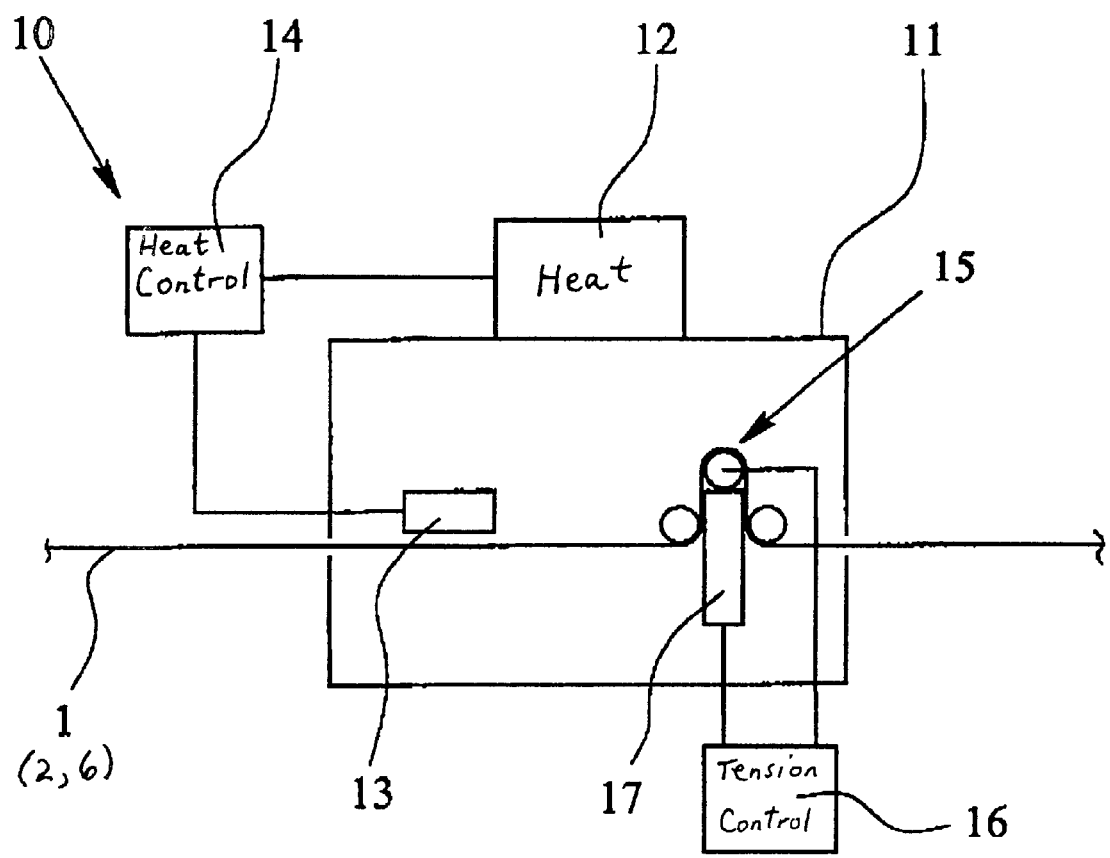
FIG. 5 is a diagrammatic illustration of an apparatus for performing the method in accordance with the invention.

In FIG. 5, an apparatus 10 for performing the method in accordance with the invention is diagrammatically illustrated as having at least one drying station 11 with an associated heat generating means 12. Within the drying station 11, there is a measurement means 13 for noncontact measurement of the print carrier layer 2 that has been provided with the adhesive layer 6. Furthermore, there is a heat control means 14 which is coupled to the heat generating means 12 and the measurement means 13, so that the actual temperature of the print carrier layer 2 with the adhesive layer 6 is measured during drying in the drying station 11, and depending on the measured actual temperature, the drying temperature is adjusted to achieve a predetermined desired temperature of the print carrier layer.

Additionally, within the drying station 11, there is a tensile stress measurement means 15 for measuring the tensile stress in the print carrier layer 2 provided with the adhesive layer 6. Moreover, a tensile stress control means 16 is coupled to a tensile stress adjustment means 17. The optimum tensile stress of the print carrier layer 2 provided with the adhesive layer 6 can be easily adjusted via the tensile stress adjustment means 17 by the tensile stress control means 16 based on the stress level detected by the tensile stress measurement means 15.

I claim:

1. Process for producing a film sheet having at least one print carrier layer of plastic, an adhesive layer and a cover layer, comprising the steps of applying the adhesive layer to the print carrier layer;

drying the print carrier layer with the adhesive layer thereon;

after said drying step, combining the print carrier layer which has been provided with the adhesive layer and the cover layer to produce the film sheet;

wherein the temperature of the print carrier layer provided with the adhesive layer is automatically controlled during said drying step by measuring the current temperature of the print carrier layer provided with the adhesive layer during said drying step, and depending on the measured current temperature of the print carrier layer provided with the adhesive layer, adjusting the drying temperature during said drying step to achieve a stipulated theoretical temperature of the print carrier layer.

2. Process as claimed in claim 1, wherein a polyolefin is used as the plastic of the print carrier layer.

3. Process as claimed in claim 2, wherein said polyolefin is selected from the group consisting of polypropylene, polybutene or polyethylene.

4. Process as claimed in claim 1, wherein the temperature to which the print carrier layer provided with the adhesive layer is controlled is a temperature between 50° C. and 70° C.

5. Process as claimed in claim 4, wherein the temperature of the print carrier layer provided with the adhesive layer is measured without contact during said drying step.

6. Process as claimed in claim 1, wherein the temperature to which the print carrier layer provided with the adhesive layer is controlled is approximately 60° C.

7. Process as claimed in claim 1, wherein the tensile stress of the print carrier layer provided with the adhesive layer is adjusted to a predetermined value during said drying step.

8. Process as claimed in claim 7, wherein the tensile stress to which the print carrier layer provided with the adhesive layer is adjusted is a tensile stress between 20 and 100 N/m.

9. Process as claimed in claim 7, wherein the tensile stress to which the print carrier layer provided with the adhesive layer is adjusted is a tensile stress of approximately 40 N/m.

10. Process as claimed in claim 1, comprising the further step of changing the interfacial energy of the print carrier layer before applying the adhesive layer depending on the surface tension of the adhesive layer for producing a good connection of the adhesive layer to the print carrier layer.

11. Process as claimed in claim 10, wherein said good connection of the adhesive layer to the print carrier layer is achieved by producing an essentially complete wetting of the side of the print carrier layer facing the adhesive layer.

12. Process as claimed in claim 10, wherein said step of changing the interfacial energy of the print carrier layer is performed by subjecting the side of the print carrier layer facing the adhesive layer to a corona treatment.

13. Process as claimed in claim 1, further comprising the step of applying a primer layer to a side of the print carrier layer to which the adhesive layer is to be applied before applying the adhesive layer.

14. Process as claimed in claim 1, wherein one of a paper layer and a plastic film, which is provided with an adhesive-repellant layer, is used as the cover layer.

15. Process as claimed in claim 1, wherein one of a paper layer and a plastic film, which is provided with a silicone layer, is used as the cover layer.

* * * * *